Feb. 3, 1970 P. R. BECK 3,492,980
AIR POLLUTION INHIBITING MEANS IN THE FORM OF A FUEL
RECIRCULATING APPARATUS FOR AN INTERNAL
COMBUSTION ENGINE
Filed Nov. 13, 1967
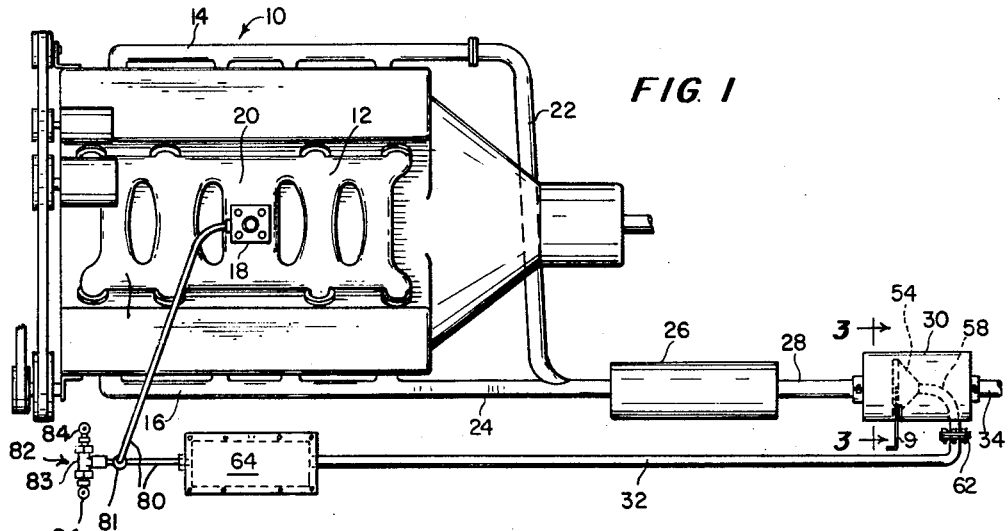
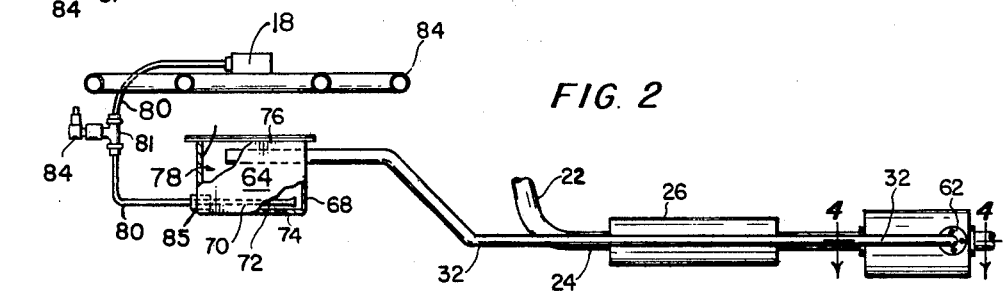
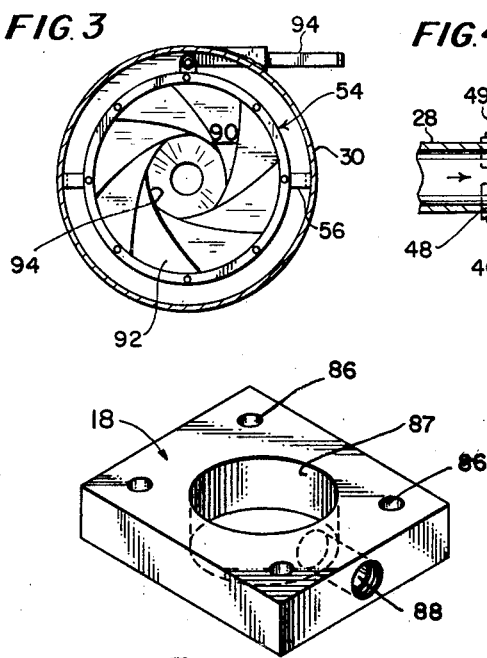
INVENTOR:
PAUL R. BECK
By Norman Gerlach

United States Patent Office 3,492,980
Patented Feb. 3, 1970

3,492,980
AIR POLLUTION INHIBITING MEANS IN THE FORM OF A FUEL RECIRCULATING APPARATUS FOR AN INTERNAL COMBUSTION ENGINE
Paul R. Beck, Los Angeles, Calif., assignor of one-half to Harry A. Bradshaw, Los Angeles, Calif.
Filed Nov. 13, 1967, Ser. No. 682,271
Int. Cl. F02m 25/06
U.S. Cl. 123—119
5 Claims

ABSTRACT OF THE DISCLOSURE

An air pollution inhibiting system for internal combustion engines comprising a tank operatively connected to the intake manifold of the engine through a vacuum line in which there is interposed a carbon trap. The tank also has one end connected to the engine tail pipe and its other end connected to the engine exhaust manifold through an exhaust pipe in which the usual muffler is interposed. Exhaust gases from the exhaust pipe enter the tank and are directed into the large end of a funnel within the tank, the small end of the funnel being in direct sealed communication with the vacuum line. An adjustable shutter valve across the mouth of the funnel controls the percentage of exhaust gases which may be returned to the intake manifold, the remaining exhaust gases by-passing the funnel and passing directly through the tank to the tail pipe.

---

The present invention relates generally to internal combustion engines and has particular reference to a fuel recirculating apparatus for appreciably reducing the amount of incompletely burned fuel that is discharged from the exhaust system of an internal combustion engine to the atmosphere.

Research in the field of smog control during recent years has established the fact that air pollution in many geographical areas is largely attributable to the unburned hydrocarbons that emanate from the exhaust systems of automotive-type internal combustion engines and are exhausted to the atmosphere, particularly during coasting of the vehicles in which the engines are installed. These unburned fractions when subjected to the catalytic action of sunlight under certain conditions result in an injurious, irritating, smog-laden atmosphere. Not only do the unburned and partially burned fractions in the exhaust gases represent a menace to the health and comfort of the community by polluting the atmosphere, but also they manifest relative inefficiency in the operation of the internal combustion engines which produce them and thus they represent an economic loss in fuel consumption.

Heretofore, in an effort to overcome the above-noted limitations that are attendant upon the operation of an automotive vehicle, means have been provided whereby an appreciable portion of the exhaust gases emanating from the exhaust manifold of the internal combustion engine for the vehicle may be conducted to the intake manifold of the engine so that it will be mixed with the fresh incoming combustible mixture and any residual unburned hydrocarbons resulting from incomplete combustion during a previous cycle will be burned to completion. This procedure is effective to reduce the amount of unburned hydrocarbons that are discharged to the atmosphere from the exhaust system of the engine but it has the decided disadvantage that it creates carbon build-up in various parts of the engine, particularly in the vicinity of the point of introduction of the recirculated gases. This carbon accumulation seldom is in the form of loose carbon that can be brushed away, even utilizing a steel wire brush. Invariably, it is in the form of a hard carbon crust which must be removed by a scraping and chipping process, sometimes requiring the use of an electric drill. Obviously, if periodic manifold and combustion chamber dome cleaning operations are not resorted to, permanent and irreparable damage to the engine will result.

The present invention affords a novel means for appreciably minimizing the quantity of unburned hydrocarbons that are discharged into the atmosphere by the internal combustion engine of an automotive vehicle, particularly under condition of coasting of the vehicle, such means being more effective than has heretofore been possible in that carbon deposits at the point of introduction into the intake system of the engine, wherever this point may be, are reduced to a minimum.

A further limitation that is attendant upon efforts to reduce air pollution by returning portions of the exhaust gases from a previous engine cycle to the intake system for combustion in a succeeding cycle resides in the fact that there is a limit to the percentage of exhaust gases which may be returned. In excess of this limit, loss of power results, this loss increasing as an arithmetical progression of the excess until a time is reached where engine failure will result. Also, a system which will afford optimum return of exhaust gases for a vehicle of a given horsepower will not give satisfactory results when associated with a vehicle of a greater or a lesser horsepower. Seasonal changes in climate involving temperature and humidity differentials also dictate the correct percentage of exhaust gases which properly should be involved in a fuel return system of the character under consideration. Additionally, altitude is a factor affecting percentage return of exhaust gases so that automobile habitat is a consideration in designing an effective smog-prevention system. For example, a system which will give optimum results for an automotive vehicle in a city such as Los Angeles which is situated approximately at sea level may give inferior performance when applied to a motor vehicle which normally is operated at high altitudes in a city such as Denver, Colo.

The present invention also obviates this latter difficulty and, accordingly, it contemplates the provision in an automotive vehicle of an air pollution inhibiting system which makes provision for regularly adjusting the amount of exhaust gases which are returned to the intake system of internal combustion engine of the vehicle. By such an arrangement, where original equipment is concerned, an initial and permanent adjustment of the system may be made by the manufacturer of the vehicle on the basis of altitude at the point of delivery of the vehicle. Alternatively, such an adjustment may be made by the automobile dealer or retailer, or it may be made by a service man at the request of the owner of the vehicle when there is to be a change of vehicle environment necessitating such an adjustment.

The provision of an air pollution system of the character briefly outlined above and possessing the stated advantages therefor constitutes the principal object of the present invention. Other objects and advantages of the invention, not at this time enumerated, will readily suggest themselves as the nature of the invention is better understood from a consideration of the following detailed description.

In the accompanying single sheet of drawings forming a part of this specification, one illustrative embodiment of the invention is shown.

In these drawings:

FIG. 1 is a fragmentary plan view of an automotive internal combustion engine having applied thereto an air pollution inhibiting system embodying the invention, the view representing a typical installation of the system;

FIG. 2 is a fragmentary side elevational view of the structure of FIG. 1;

FIG. 3 is a vertical transverse sectional view taken on the line 3—3 of FIG. 1;

FIG. 4 is a vertical longitudinal sectional view taken on the line 4—4 of FIG. 2; and FIG. 5 is an enlarged perspective view of a carburetor mounting adapter which is employed in connection with the present invention.

Referring now to the drawings in detail and in particular to FIGS. 1 and 2, the improved air pollution inhibiting system of the present invention is illustrated in these views as being operatively installed upon an internal combustion engine 10 which is of conventional or standard design, and in the form selected for illustration herein, is an automotive vehicle engine of the so-called V–8 type, the supporting chassis for the engine being omitted in the interest of clarity.

The engine 10 is of conventional construction and, therefore, its illustration in FIGS. 1 and 2 is largely schematic. Among the illustrated parts or adjuncts of the engine are the intake manifold 12, the exhaust manifolds 14 and 16, and a carburetor mounting adapter 18, the latter being disposed on one of the cross-over legs 20 of the intake manifold 12. The products of combustion from the right bank of the engine cylinders are discharged into the exhaust manifold 14 and flow through a cross-over exhaust pipe 22 to the main engine exhaust pipe 24 which leads rearwardly from the left bank of engine cylinders as shown in FIG. 1. From the exhaust pipe 24, the products of combustion flow successively through the usual exhaust system muffler 26 and tail pipe 28, and then, instead of being discharged directly to the atmosphere as is the case of a conventional exhaust system that is not equipped with pollution inhibiting means, they pass through a proportioning device 30 in the form of a gas distribuiton shell. From such shell, a portion of the exhaust gases are discharged to a return conduit 32 by means of which they are returned to the intake manifold 12 of the engine 10. The remaining exhaust gases in the shell of the proportioning device 30 are discharged through a terminal pipe 34 to the atmosphere. The proportioning device thus functions in the manner of a two-way distribution or proportioning valve.

With the exception of the proportioning device 30 and the return conduit 32, the arrangement of the exhaust system thus far described is purely conventional and is exemplary of one form of exhaust system to which the present invention is applicable. The invention may, by suitable modification if required or necessary, be applied to any other type of exhaust system.

Referring now, additionally, to FIGS. 3 and 4 of the drawings, the gas distribution shell of the proportioning device 30 is preferably, but not necessarily, of cylindrical design and is adapted to be suitably supported from a stationary portion of the vehicle chassis. Since it is disposed in the vicinity of the tail pipe 28, it may conveniently be suspended beneath the rear portion of the vehicle chassis by conventional mounting brackets or straps (not shown) or it may be supported solely by its interpositioning between the tail pipe 28 and the terminal pipe 34, both of which pipes may be suspended by the usual flexible strap-type mounting connections from the underneath side of the vehicle chassis.

The shell of proportioning device 30, being of cylindrical design as aforesaid, embodies a circular front wall 40, a circular rear wall 42, and a connecting cylindrical side wall 44. The rear end of the tailpipe 28 communicates with the chamber 46 in the gas distribution shell of the device 30 through an opening 48 in the central portion of the front wall 40. The connection of the rear end of the tail pipe to the gas distribution shell is made by a conventional split flange and strap assembly 49, such assembly being suitably attached to the central portion of the front wall 40. A similar opening 50 is provided in the central portion of the rear wall 42 and a split flange and strap assembly 52 establishes a connection between the gas distribution shell and the front end of the terminal pipe 34.

As best seen in FIG. 4, a collection funnel 54 of frusto-conical design is disposed within the chamber 46 in axial relationship with respect thereto and has its large rim positioned in the forward region of the chamber and directly opposing the gas inlet opening 48 in the central portion of the front wall 40. Said funnel 54 is supported from the cylindrical side wall 44 of the distribution shell of the proportioning device 30 by way of brackets 56 which are welded or otherwise fixedly secured to the funnel and said side wall. The small rim of the funnel 54 is connected to and communicates with one end of a curved lead-out tube 58. The latter projects outwardly through, and is welded to the rim of, an outlet opening 60 in the cylindrical side wall 44 of the gas distribution shell. The other or externally disposed end of the lead-out tube 58 is connected by a conventional flange-type connector 62 to the rear end of the return pipe 32 as shown in FIGS. 1 and 4.

As previously indicated, the proportioning device 30 including the gas distribution shell is for the purpose of withdrawing a predetermined portion of the exhaust gases emanating from the tail pipe 28 and returning the same to the intake manifold 12 of the engine 10 through the return pipe 32. Accordingly, the front end of the return pipe 32 communicates with the interior of a carbon trap 64 in the form of a generally rectangular container which is supported in any suitable manner beneath the hood of the automotive vehicle in the vicinity of the engine 10. This carbon trap consists of front and rear walls 66 and 68, a pair of opposed spaced apart side walls 70 and 72, a bottom wall 74, and a top wall 76 and defines an internal chamber 78 with which the front end of the return pipe 32 communicates by way of an opening in the rear wall 68 of the carbon trap. Said return pipe 32 projects through the opening so that it extends to a point adjacent to the front wall 66. A vacuum line 80 establishes communication between the chamber 78 and the carburetor adapter 18 and has interposed therein a T-fitting 81, one leg of which is connected to a check valve assembly 82 by means of which atmospheric air is admitted to the line so that the oxygen content of the air may be admixed with the unburned hydrocarbons which are pulled from the aforementioned shell 30. The check valve assembly includes a three way fitting 83, one leg of which is connected to the T-fitting 81 and the two other legs of which carry check valves proper 84 which normally remain closed, but when a predetermined degree of subatmospheric pressure is developed within the vacuum line 80 automatically become open in order to bleed a predetermined quantity of air into this line. One end of the vacuum line 80 projects through a sleeve 85 on the front wall 66 of the carbon trap 64 to a point near the rear wall 68 and thus it will be seen that the gases which enter the trap from the return pipe 32 are obliged to travel diagonally across the chamber 78 before leaving the same. The sleeve 85 permits said one end of the vacuum line 80 to be adjusted longitudinally in order to bring the extremity thereof nearer to or farther from the back wall 68. The carburetor adapter 18 is in the form of a rectangular block (see FIG. 5) having mounting holes 86 which receive therethrough the usual carburetor mounting studs (not shown) so that these studs serve to position the adapter between the carburetor and the intake manifold 12. A central circular passage 87 in the block registers with the carburetor throat and a radial passage 88 is adapted for communication with the adjacent end of the vacuum line 80. The carbon trap 64 functions in the manner of a settling tank for carbon particles which, upon entering the chamber 78, lose their kinetic energy during their diagonal movement across the latter and settle to the bottom of the trap.

In order to regulate the amount of exhaust gases which are withdrawn from the gas distriubtion shell of the proportioning device 30 and returned to the intake manifold 12 of the engfine 10, the funnel 54 is equipped with a shutter mechanism 90. The latter is of the general type which is commonly employed in connection with the object lens of a camera and consists of a series of overlapping half-moon plates 92 which lie in the same general operating plane and establish a variable central opening 94, the latter being disposed in the general vertical plane of the large rim of the frusto-conical funnel 54. An operating lever 96 (see FIG. 1) projects outwardly of the cylindrical side wall 44 of the gas distribution shell of the device 30 and is adapted to be adjusted to regulate the quantity of exhaust gases which may enter the funnel from the tail pipe 28.

Except for the fact that it is possible by means of the operating lever 96 to regulate the amount of exhaust gases which are withdrawn from the gas distribution shell and returned to the intake manifold 12 of the engine 10, the operation of the herein described apparatus is entirely automatic. In most instances, the position of the lever 96 will not be changed during the entire life of the automotive vehicle to which the present air pollution inhibiting system or apparatus is applied. It is contemplated that the position of the lever 96 will be adjusted at the factory, its position being determined by such factors as the mean altitude at which the vehicle ordinarily will be operated and the horsepower of the involved engine. Thus, for all intents and purposes, the present system or apparatus may be regarded as being devoid of controls insofar as the owner of the vehicle is concerned.

Upon starting the engine 10, subatmospheric or vacuum pressure in varying degrees is applied to the chamber 46 of the gas distribution shell of the proportioning device 30 through the vacuum line 80, the carbon trap 64, and the return line 32. Thus, subatmospheric pressure is reflected in the aforementioned gas distribution shell by a suction which exhibits itself at the mount of the funnel 54 so that a portion of the exhaust gases issuing from the tail pipe 28 are drawn into the funnel while the remainder of such gases are caused to bypass the funnel and pass through the annulus which exists between the funnel 54 and the cylindrical wall 44 of said gas distribution shell. The subatmospheric pressure which is applied to the chamber 46 is essentially and particularly great when the engine 10 is idling and even more so when the vehicle is coasting with the engine serving to apply a braking force thereto. At such times, the suction that is established in the funnel 54 is of appreciable magnitude so that a larger quantity of the exhaust gases emanating from the tail pipe 28 is drawn into the funnel than when the engine is being supplied with fuel. In this respect, the present system or apparatus is automatic in its operation.

The unburned hydrocarbons which are present in the exhaust gases that are drawn into the funnel 54 are transmitted through the return pipe 32 to the carbon trap 64 where all solid carbon particles settle out as previously described so that substantially particle-free gases pass from the carbon trap 64 through the intake line 80 to the intake manifold 12. In passing through the intake line 80, these gases are admixed with oxygen which is drawn into the gas streams through the check valve assembly 102. The check valve assembly 102 is so designed that it is extremely sensitive to subatmospheric pressure within the intake manifold 12 and the intake line 80 with the result that even a slight degree of vacuum in the line is sufficient to draw air into the system for admixture with the return gases which pass to the intake manifold from the carbon trap 64. The oxygen content of such air is thus, at all times, sufficient to support combustion of all of the gaseous constituents undergoing recirculation.

From the above description, it will be apparent that there is provided a system or apparatus which appreciably reduces the unburned and incompletely burned hydrocarbons that are discharged from the engine exhaust system to the atmosphere. Moreover, the improved system or apparatus assures a more complete combustion of the fuel-air mixture being fed to the engine cylinders. In connection with the operation of the system or apparatus, only a small proportion of the unburned hydrocarbons that ordinarily would be discharged to the atmosphere in the absence of the present apparatus are so discharged.

The invention is not to be limited to the exact arrangement of parts shown in the accompanying drawings or described in this specification as various changes in the details of construction may be resorted to without departing from the spirit or scope of the invention. For example, whereas the means for proportioning the quantity of exhaust gases issuing from the tail pipe 28 so that a greater or lesser quantity of such gases will be returned to the intake manifold 12 comprises a funnel-like collector having a camera-type shutter or valve arrangement at its entrance mouth, it is within the purview of the invention to utilize other means for regulating the quantity of exhaust gases which may enter such collector. If desired, a sliding cut-off plate may be provided at the base of the funnel 54, or, alternatively, a swinging vane-type shutter may be provided.

Having thus described the invention what I claim as new and desire to secure by Letters Patent is:

1. The combination with an internal combustion engine having an intake manifold and an exhaust pipe, of a fuel recirculating apparatus adapted to return unburned fuel constituents from the exhaust pipe to the intake manifold and comprising a proportioning device in the form of a shell having a cylindrical side wall and circular front and rear end walls, said shell defining an internal chamber having a single inlet centrally disposed in said front wall, a first outlet disposed in said sidewall, and a second outlet centrally disposed in said rear wall, a return line connecting one of said outlets with the intake manifold, the other outlet communicating with the atmosphere, said inlet being connected to the exhaust pipe, a carbon trap disposed in said return line, said carbon trap being in the form of a container defining an internal settling chamber for carbon particles, and proportioning means disposed within said shell for directing a portion of the exhaust gases issuing from the exhaust pipe into said return line through said one outlet and the remaining portion of such exhaust gases to the atomsphere through said other outlet, said proportioning means comprising a generally frusto-conical collector funnel disposed within said shell in coaxial relationship with respect thereto, spaced from the sidewall thereof, and having a wide circular entrance mouth at its large base and a discharge opening at its small base, means for varying the effective size of said entrance mouth, and a lead-out tube connecting said discharge opening with said one outlet, said collector funnel being disposed with its entrance mouth spaced rearwardly from and directly opposing said entrance opening in the front wall of the shell so that a portion of the gases issuing from the entrance opening will enter the collector funnel and pass to said return line while the remaining gases will bypass said funnel and be discharged from said other outlet.

2. The combination set forth in claim 1 and wherein said means for varying the effective size of said entrance mouth comprises a camera-type shutter extending across said entrance mouth.

3. The combination of claim 2 and including, additionally, a muffler interposed in said exhaust pipe.

4. The combination set forth in claim 1, wherein said carbon trap is provided with front and rear walls, each of which is formed with an opening therethrough, the front end region of that portion of the return line which is connected to said one outlet projecting through the opening in said rear wall and extending forwardly in the settling chamber, the rear end region of that portion of the return line which is connected to said intake manifold projecting through the opening in said front wall and extending rearwardly in the settling chamber, one of said openings slidably receiving the adjacent portion of the return line to the end that the extent of projection of the latter into the settling chamber may be regulably adjusted.

5. The combination set forth in claim 4, wherein the opening which slidably receives the adjacent portion of the return line is the opening in said front wall of the container.

References Cited

UNITED STATES PATENTS

| | | |
|---|---|---|
| 1,640,790 | 8/1927 | McClain. |
| 2,051,559 | 8/1936 | Keeley. |
| 2,084,142 | 6/1937 | Horton. |
| 2,325,543 | 7/1943 | Redinger. |
| 2,446,266 | 8/1948 | Cummings _____ 60—244 X |
| 2,584,674 | 2/1952 | Da Costa _____ 123—119 |
| 2,954,967 | 10/1960 | Johnson. |
| 3,262,437 | 7/1966 | Bradshaw. |
| 3,304,711 | 2/1967 | Eastman _____ 60—29 |

AL LAWRENCE SMITH, Primary Examiner

U.S. Cl. X.R.

60—29